US012513265B2

(12) United States Patent
Lee

(10) Patent No.: US 12,513,265 B2
(45) Date of Patent: Dec. 30, 2025

(54) METHOD AND SYSTEM FOR IMPROVING IMAGE QUALITY OF DISPLAY DEVICE FOR VEHICLE

(71) Applicant: HYUNDAI MOBIS CO., LTD., Seoul (KR)

(72) Inventor: Jung Young Lee, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 20 days.

(21) Appl. No.: 18/417,382

(22) Filed: Jan. 19, 2024

(65) Prior Publication Data
US 2024/0406351 A1 Dec. 5, 2024

(30) Foreign Application Priority Data
Jun. 5, 2023 (KR) .......................... 10-2023-0072239

(51) Int. Cl.
*G06T 7/00* (2017.01)
*B60R 1/20* (2022.01)
*H04N 7/18* (2006.01)
*H04N 23/60* (2023.01)
*H04N 23/62* (2023.01)

(52) U.S. Cl.
CPC ............... *H04N 7/183* (2013.01); *B60R 1/20* (2022.01); *G06T 7/0002* (2013.01); *H04N 23/62* (2023.01); *H04N 23/64* (2023.01); *B60R 2300/30* (2013.01); *G06T 2207/30168* (2013.01); *G06T 2207/30204* (2013.01); *G06T 2207/30252* (2013.01)

(58) Field of Classification Search
CPC .. G06F 11/321; G09G 3/006; G09G 2330/10; G09G 2330/46; G09G 2330/04; G09G 2330/02; G09G 2320/02; G09G 2320/04; G09G 2320/046; G09G 2320/06; H04N 23/62; H04N 23/64; B60R 1/20; B60R 2300/30; G06T 7/0002; G06T 2207/30168; G06T 2207/30204; G06T 2207/30252
See application file for complete search history.

(56) References Cited

U.S. PATENT DOCUMENTS

| 6,611,241 | B1 * | 8/2003 | Firester ................... H04N 9/12 345/1.3 |
| 9,641,767 | B2 * | 5/2017 | Lim ...................... H04N 23/741 |
| 9,706,111 | B2 * | 7/2017 | Saad ...................... G06V 10/50 |
| 10,565,696 | B2 * | 2/2020 | Kasilya Sudarsan ........ H04N 23/633 |
| 11,010,884 | B2 * | 5/2021 | Nabavi ................... G06T 7/168 |
| 11,170,488 | B2 * | 11/2021 | Nam ....................... G06T 7/0002 |
| 11,172,193 | B1 * | 11/2021 | Reddy ................... H04N 23/633 |
| 11,470,293 | B2 * | 10/2022 | Park ....................... G01J 3/0272 |
| 2003/0174230 | A1 * | 9/2003 | Ide ........................ H04N 23/663 348/E5.045 |

(Continued)

*Primary Examiner* — Brian P Yenke
(74) *Attorney, Agent, or Firm* — NovoTechIP International PLLC

(57) ABSTRACT

The present disclosure relates to improving the image quality of a display device for a vehicle and relates to a method and a system for improving the image quality of a display device for a vehicle, which capture an image for quality analysis displayed on a vehicle display device using a user device and reflect a compensation value calculated based on the captured image for quality analysis on the image to be displayed for compensation, thereby improving the image quality.

9 Claims, 8 Drawing Sheets

(56) References Cited

U.S. PATENT DOCUMENTS

| | | | |
|---|---|---|---|
| 2005/0232476 A1* | 10/2005 | Hayakawa | G09G 3/006 382/141 |
| 2009/0039233 A1* | 2/2009 | Hiraga | H04N 1/409 250/201.8 |
| 2010/0091169 A1* | 4/2010 | Border | H04N 25/60 348/E5.042 |
| 2010/0201832 A1* | 8/2010 | Chen | G06V 10/993 348/222.1 |
| 2011/0013072 A1* | 1/2011 | Choi | H04N 23/632 345/173 |
| 2011/0080471 A1* | 4/2011 | Song | G06T 7/521 356/627 |
| 2012/0062786 A1* | 3/2012 | Hamano | H04N 23/633 396/125 |
| 2014/0063210 A1* | 3/2014 | Tao | H04N 13/327 348/54 |
| 2014/0375816 A1* | 12/2014 | Maihoefer | B60K 35/28 348/148 |
| 2015/0163399 A1* | 6/2015 | Beaurepaire | H04N 5/2621 348/222.1 |
| 2015/0242178 A1* | 8/2015 | Cho | G06F 3/1446 345/1.2 |
| 2015/0279033 A1* | 10/2015 | Murakami | G06T 7/0014 382/128 |
| 2015/0286899 A1* | 10/2015 | Nakayama | G06T 3/18 382/224 |
| 2016/0165120 A1* | 6/2016 | Lim | H04N 23/741 348/148 |
| 2017/0013191 A1* | 1/2017 | Saad | G06V 20/35 |
| 2017/0163904 A1* | 6/2017 | Yan | H04N 5/772 |
| 2017/0180659 A1* | 6/2017 | Levoy | G06T 3/4038 |
| 2017/0201745 A1* | 7/2017 | Abramov | H04N 23/64 |
| 2018/0272939 A1* | 9/2018 | Starke | H04N 5/272 |
| 2018/0350106 A1* | 12/2018 | Kasilya Sudarsan | H04N 23/633 |
| 2019/0052872 A1* | 2/2019 | Shyshkin | G09G 3/006 |
| 2019/0068930 A1* | 2/2019 | Kato | H10F 39/8063 |
| 2019/0244566 A1* | 8/2019 | Kim | G09G 5/02 |
| 2020/0074615 A1* | 3/2020 | Nabavi | G06T 7/168 |
| 2020/0211172 A1* | 7/2020 | Nam | G06T 5/70 |
| 2020/0221166 A1* | 7/2020 | Park | H04N 21/4318 |
| 2021/0084219 A1* | 3/2021 | Ito | G02B 27/46 |
| 2021/0281738 A1* | 9/2021 | Jeppsson | H04N 23/676 |
| 2022/0086334 A1* | 3/2022 | Ariyama | H04N 23/88 |
| 2022/0086409 A1* | 3/2022 | Park | G01J 3/524 |
| 2023/0281758 A1* | 9/2023 | Rotscholl | H04N 17/002 382/264 |
| 2023/0289942 A1* | 9/2023 | Yoo | G06T 5/70 |
| 2024/0054619 A1* | 2/2024 | Ollila | G06T 5/73 |
| 2024/0320790 A1* | 9/2024 | Iwahana | G06T 5/00 |
| 2024/0331604 A1* | 10/2024 | Barber | G06T 7/90 |

* cited by examiner

[pixel mapping after capturing]

average of all pixels of 10x10 : 207.4nit

A area (80pixel, 210nit)
B area (14pixel, 200nit)
C area (6pixel, 190nit)

if the maximum brightness is 900 nits,
there is difference of about 4 nits in 1 bit
at 128 gray levels (difference in brightness
depending on level follows 2.2 gamma curve)

(a)

(LUT values)

| 1 | 1 | 1 | 1 | 1  | 1  | 1  | 1  | 1  | 1 |
|---|---|---|---|----|----|----|----|----|---|
| 1 | 1 | 1 | 1 | 1  | 1  | 1  | 1  | 1  | 1 |
| 1 | 1 | 1 | 1 | 1  | -2 | -2 | -2 | -2 | 1 |
| 1 | 1 | 1 | 1 | 1  | -2 | -4 | -4 | -2 | 1 |
| 1 | 1 | 1 | 1 | 1  | -2 | -4 | -4 | -2 | 1 |
| 1 | 1 | 1 | 1 | 1  | -2 | -4 | -4 | -2 | 1 |
| 1 | 1 | 1 | 1 | 1  | -2 | -2 | -2 | -2 | 1 |
| 1 | 1 | 1 | 1 | 1  | 1  | 1  | 1  | 1  | 1 |
| 1 | 1 | 1 | 1 | 1  | 1  | 1  | 1  | 1  | 1 |
| 1 | 1 | 1 | 1 | 1  | 1  | 1  | 1  | 1  | 1 |

(b)

METHOD AND SYSTEM FOR IMPROVING IMAGE QUALITY OF DISPLAY DEVICE FOR VEHICLE

CROSS-REFERENCE TO RELATED APPLICATIONS

This application is based on and claims priority under 35 U.S.C. 119 to Korean Patent Application No. 10-2023-0072239, filed on Jun. 5, 2023, in the Korean Intellectual Property Office, the disclosure of which is herein incorporated by reference in its entirety.

TECHNICAL FIELD

The present disclosure relates to improving the image quality of a display device for a vehicle and, specifically, to a method and a system for improving the image quality of a display device for a vehicle, which capture an image for quality analysis displayed on a vehicle display device using a user device and reflect a compensation value calculated based on the captured image for quality analysis on the image to be displayed for compensation, thereby improving the image quality.

BACKGROUND

Display devices such as OLEDs and LCDs have a feature in which the brightness decreases over operation time due to device characteristics. This feature causes deterioration of image quality (burn-in phenomenon), so various studies are being conducted to solve the problems with image quality caused by the deterioration of image quality.

For example, methods for improving image quality include an image data accumulation and storage method, an active sensing method, and the like.

The image data accumulation and storage method is a method of continuously storing the distribution of the display image and applying a compensation value to a pixel that is frequently operated, thereby improving the image quality, and the active sensing method is a method of applying hardware that senses changes in current/voltage and threshold voltage for each pixel diode of a display panel to the display panel and directly calculating the degree of deterioration of the pixel, thereby improving the image quality.

The image data accumulation/storage method has the disadvantage of requiring hundreds of gigabytes of memory because pixel data of the entire screen must be continuously accumulated, causing high costs. In addition, the image data accumulation/storage method has the disadvantage of resulting in a large error because it is a prediction compensation method based on estimation.

Since the active sensing method requires a structurally complex display panel, there is a problem in which the manufacturing cost of the display panel increases, and it is able to be implemented only by panel manufacturers.

Meanwhile, since vehicle display devices display screens, based on a fixed graphic user interface (GUI), they are inevitably more vulnerable to deterioration of image quality than other products that display screens, based on various types of GUIs.

Therefore, there is a need for an image quality improvement method capable of solving the shortcomings of the conventional image quality improvement methods and being applied to vehicle display devices.

This background technology is technical information possessed by the inventor for deriving the present disclosure or acquired in the process of deriving the present disclosure, and cannot necessarily be regarded as known technology disclosed to the public before filing the application of the present disclosure.

SUMMARY

The embodiment disclosed in the present disclosure has been made in consideration of the above-mentioned needs, and is directed to providing a method and a system for improving image quality applicable to vehicle display devices.

In addition, the embodiment of the present disclosure is directed to providing a method and a system for improving image quality of a vehicle display device, which are able to be implemented at a lower cost than before by improving the image quality of the display device using personal electronic devices such as smartphones and the like.

In addition, the embodiment of the present disclosure is directed to providing a method and a system for improving image quality of a vehicle display device, which are able to calculate a compensation value optimized for each display device and solve the problem with occurrence of errors by capturing an image displayed on the display device and calculating the compensation value, based on the obtained image.

The technical subjects of the present disclosure may not be limited to the above-mentioned technical subjects, and other technical subjects intended by the present disclosure may be clearly understood, through the following descriptions, by those skilled in the art to which the present disclosure pertains.

A method for improving image quality of a vehicle display device through linking a vehicle display controller and a user device may be provided in order to solve the above-described technical problems.

The method for improving image quality of a vehicle display device according to an embodiment may include capturing, by the user device, an image for quality analysis displayed on the display device by applying defocus, determining, by the user device, whether or not the captured image for quality analysis is valid, if the captured image for quality analysis is valid, obtaining, by the user device, a compensation value, based on the captured image for quality analysis, and transmitting, by the user device, the compensation value to the vehicle display controller such that the vehicle display controller outputs an image by reflecting the compensation value.

According to an embodiment, the determining may include determining the degree of defocus, based on a marking pattern included in the captured image for quality analysis.

According to an embodiment, the determining may include determining whether or not the captured image for quality analysis is an image captured by a camera located at a correct position, based on a direction of a marking pattern included in the captured image for quality analysis.

According to an embodiment, the determining may include determining whether or not defocus occurs and the degree of defocus if defocus occurs, based on the degree to which the marking pattern overlaps, and determining that the captured image for quality analysis is not valid if defocus does not occur or if the degree of defocus exceeds a predetermined reference value.

According to an embodiment, the determining may include determining that the image for quality analysis was captured by the camera located at the correct position if four corners of the marking pattern are at right angles.

According to an embodiment, the method for improving image quality of a vehicle display device may include re-performing the capturing if the user device receives a retry signal from the vehicle display controller after transmitting the compensation value to the vehicle display controller, and ending the operation if an end signal is received from the vehicle display controller.

According to an embodiment, the method for improving image quality of a vehicle display device may include, if the captured image for quality analysis is not valid, adjusting, by the user device, the camera and then re-performing the capturing.

A method for improving image quality of a vehicle display device according to an embodiment may include outputting, by the vehicle display controller, an image for quality analysis to the display device, receiving, by the vehicle display controller, a compensation value from the user device, and outputting, by the vehicle display device, to the display device, an image by reflecting the compensation value.

According to an embodiment, the method for improving image quality of a vehicle display device may include receiving, by the vehicle display device, a retry or end input through a user interface after outputting an image reflecting the compensation value, and outputting, by the vehicle display device, a retry signal or an end signal to the user device according to the input.

The embodiment may provide a system for improving image quality of a vehicle display device through linking a vehicle display controller and a user device.

According to an embodiment, the user device may capture an image for quality analysis displayed on the display device, determine whether or not the captured image for quality analysis is valid, obtain a compensation value, based on the captured image for quality analysis, if the captured image for quality analysis is valid, and transmit the compensation value to the vehicle display controller.

According to an embodiment, the vehicle display controller may output an image for quality analysis to the display device and output an image by reflecting the compensation value transmitted from the user device to the display device.

In addition to the above-mentioned solutions to the technical subjects, detailed particulars according to various embodiments of the present disclosure are included in the following description and the accompanying drawings.

According to the embodiment disclosed herein, it is possible to provide a method and a system for improving image quality of a vehicle display device through interlinkage between a vehicle display controller and a user device.

According to an embodiment, it is possible to provide a method and a system for improving image quality of a vehicle display device capable of being implemented at a lower cost than before by improving the image quality of the display device using personal electronic devices such as smartphones and the like.

According to an embodiment, it is possible to provide a method and a system for improving image quality of a vehicle display device capable of calculating a compensation value optimized for each display device and solving the problem with occurrence of errors by capturing an image displayed on the display device and calculating the compensation value, based on the obtained image.

According to an embodiment, since the compensation value is obtained based on the image, there is no need to continuously accumulate pixel data of the entire screen, so high-capacity memory is not required, thereby significantly reducing the implementation cost.

In addition, using the method or system according to the embodiment has the advantages of not requiring a complicated display panel and not relying on the panel manufacturers.

In addition, the method according to the embodiment is a technology that is universally applicable to other fields (e.g., display devices for TVs, etc.), as well as to vehicle display devices, and the performance thereof may be consistently improved.

Advantageous effects of the present disclosure may not be limited to the above-mentioned effects, and other effects which are not mentioned may be clearly understood, through the following descriptions, by those skilled in the art to which the present disclosure pertains.

The above-mentioned subjects to be solved, solutions thereto, and advantageous effects are not intended to specify essential features of the claims, and thus the scope of protection of the claims is not limited by the description of the contents of the present disclosure.

BRIEF DESCRIPTION OF THE DRAWINGS

The drawings attached below are intended to help understanding of embodiments of the present disclosure and provide embodiments along with detailed descriptions. However, the technical features of this embodiment are not limited to specific drawings, and the features disclosed in the respective drawings may be combined to constitute a new embodiment.

DETAILED DESCRIPTION

Figure 1:
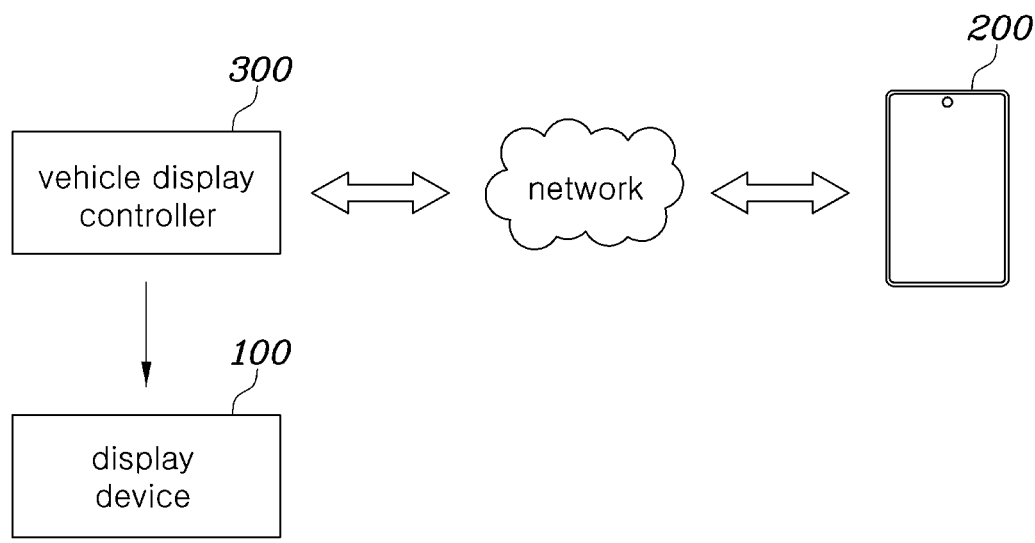
FIG. 1 is a diagram illustrating the configuration of a system for improving image quality of a vehicle display device according to an embodiment of the present disclosure.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Shapes, sizes, ratios, angles, and numbers disclosed in the drawings for explanation of embodiments of the present disclosure are provided merely by way of example, and thus the present disclosure is not limited to those illustrated in the drawings. The same or like reference signs designate the same or like elements throughout the specification. Furthermore, in describing the present disclosure, when it is determined that the detailed description of the known relevant arts unnecessarily obscures the subject matter of the present disclosure, the detailed description will be omitted. In the case where the expressions "comprise," "have," and "include" mentioned in the specification are used, another part may be added unless the term "only" is used. An element expressed in a singular form may include plural forms unless definitely indicated otherwise.

In construing an element, the element is to be construed as covering an error range although there is no explicit description of the error range.

In describing a temporal relationship, when a temporal order is described using, for example, "after," "subsequent to," "next to," or "before," the temporal order may include cases which are not continuous unless the term "just" or "immediately" is used.

The terms "first," "second," and the like may be used to describe various elements, but the elements are not limited by these terms. These terms are used merely to distinguish one element from the others. Therefore, a first element as used in the following description may be a second element without departing from the spirit of the present disclosure.

In describing the elements of the present disclosure, such terms as "first," "second," "A," "B," "(a)," and "(b)" may be used. These terms are used merely to discern the corresponding elements from the other elements, and the essence, sequence, order, or number of the corresponding elements are not limited by the terms. It will be understood that when an element is referred to as being "connected to" or "coupled to" another element, the element may be directly connected to or coupled to the other element, but yet another element may be interposed between the respective elements that may be connected or coupled indirectly to each other.

The term "at least one" should be understood as including any or all combinations of one or more of the associated elements enumerated. For example, "at least one of a first element, a second element, and a third element" may mean not only the first element, the second element, or the third element, but also all combinations of two or more of the first element, the second element, and the third element.

The respective features of various embodiments of the present disclosure may be partially or entirely coupled to or combined with each other and may be technically linked and inter-operated with each other in various manners, and the respective embodiments of the present disclosure may be carried out independently of each other or may be carried out in association with each other.

For the convenience of description, the scale of elements illustrated in the drawings may differ from the real scale, and thus the elements are not limited by the scale illustrated in the drawings.

Hereinafter, a method and a system for improving image quality of a vehicle display device according to an embodiment of the present disclosure will be described with reference to the attached drawings.

Figure 2:
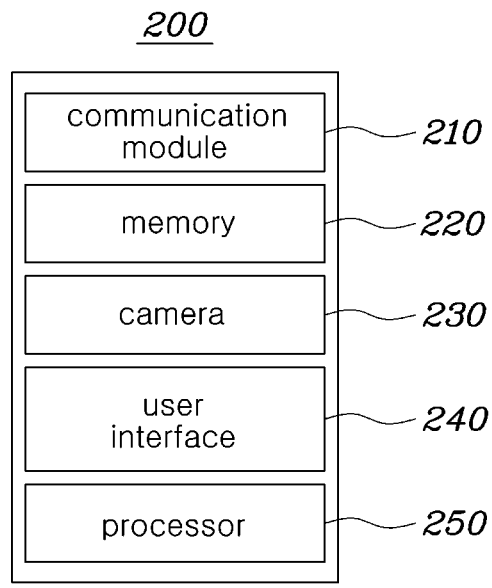
FIG. 2 is a block diagram illustrating the internal configuration of a user device of the image quality improvement system shown in FIG. 1.
Figure 3:
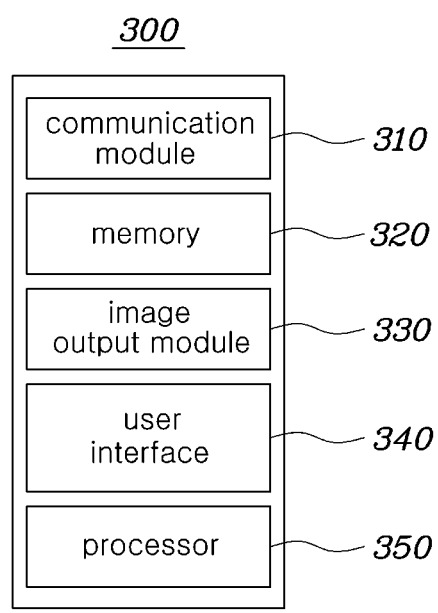
FIG. 3 is a block diagram illustrating the internal configuration of a vehicle display controller of the image quality improvement system shown in FIG. 1.

FIG. 1 is a diagram illustrating the configuration of a system for improving image quality of a vehicle display device according to an embodiment of the present disclosure, FIG. 2 is a block diagram illustrating the internal configuration of a user device 200 of the image quality improvement system shown in FIG. 1, and FIG. 3 is a block diagram illustrating the internal configuration of a vehicle display controller 300 of the image quality improvement system shown in FIG. 1.

Referring to FIG. 1, an image quality improvement system according to an embodiment of the present disclosure is intended to improve the image quality of a display device 100 mounted to a vehicle, and may be implemented to improve the image quality of the display device 100 by interlinkage between a user device 200 and a vehicle display controller 300.

To this end, an app (or program or software) for an image quality improvement process may be installed in the user device 200 and the vehicle display controller 300. The app for an image quality improvement process installed in each of the user device 200 and vehicle display controller 300 may be implemented such that the user device 200 and vehicle display controller 300 proceed with a process to improve the image quality of the display device 100.

To distinguish between the app for an image quality improvement process installed in the user device 200 and the app for an image quality improvement process installed in the vehicle display controller 300, the app for an image quality improvement process installed in the user device 200 may be referred to as a "first image quality improvement processing app" or an "image quality improvement processing user app", and the app for an image quality improvement process installed in the vehicle display controller 300 may be referred to as a "second image quality improvement processing app" or an "image quality improvement processing vehicle app".

The user device 200 and the vehicle display controller 300 may interlinked through a wired network or a wireless network (e.g., Bluetooth, Wi-Fi, LTE, etc.), and the type of network is not limited to any one network.

The display device 100 according to the embodiment may be mounted to a vehicle and may be a display device constituting an infotainment system. For example, the display device 100 may display information, such as directions, necessary for driving and display images to provide various entertainment services.

The location of the display device 100 is not limited, and for example, the display device 100 may be disposed on the dashboard, driver's seat, passenger seat, rear seat, ceiling, or the like. The display device 100 may be expressed as a head-up Display (HUD), center information display (CID), cluster, passenger display device, etc. depending on the disposed location and function.

The display device 100 may include at least one of a liquid crystal display (LCD), a thin-film transistor-liquid crystal display (TFT LCD), an organic light-emitting diode (OLED), a flexible display, and a 3D display, and the type of the display device 100 is not limited thereto.

The display device 100 according to the embodiment may display an image provided from the vehicle display controller 300. For example, the display device 100 may display an infotainment image or an image for quality analysis.

Here, the infotainment image may refer to an image for providing infotainment services, and the image for quality analysis may refer to an image used to analyze the image quality of the display device 100.

Referring to FIGS. 1 and 2, the user device 200 according to an embodiment may be linked with the vehicle display controller 300. After being interlinked with the vehicle display controller 300, the user device 200 may perform an image quality improvement process.

For example, the user device 200 may be linked with the vehicle display controller 300 as a first image quality improvement processing app is executed, and the linking process itself may be regarded as being included in the image quality improvement process.

The user device 200 may include a communication module 210, a memory 220, a camera 230, a user interface 240, and a processor 250, but the configuration of the user device 200 is limited thereto.

The communication module 210 is a component serving to communicate with the vehicle display controller 300, and may be linked with the vehicle display controller 300 through a network, thereby transmitting and receiving a variety of data or signals.

The memory 220 may store configuration values or data necessary for the operation of at least one component (e.g., the processor 250) of the user device 200, and may store one or more instructions executable by the processor 250.

According to an embodiment, the memory 220 may store a first image quality improvement processing app that analyzes images obtained by the camera 230 to calculate compensation values.

The camera 230 may photograph a subject and store the captured image in the memory 220 or transmit the same to the processor 250. For example, the camera 230 may perform photography according to commands from the processor 250.

The user interface 240 may be implemented to receive instructions from the outside (e.g., a user).

For example, the user interface 240 may include an interface that receives an input for starting the image quality improvement process and, if the interface is manipulated by the user, output a signal to start the image quality improvement process to the processor 250.

For example, the user interface 240 may include an interface that receives configuration of authority for the image quality improvement process. The interface is a component that receives configuration indicating whether the user device 200 has master (or main) or slave (or sub) authority for the image quality improvement process, and may store a value corresponding to the input configuration in the memory 220 and output the same to the processor 250.

The processor 250 may perform the overall operation of the user device 200 according to configuration and perform a predetermined operation by executing one or more instructions or programs stored in the memory 220.

According to an embodiment, the processor 250 may perform an image quality improvement process by executing the first image quality improvement processing app stored in the memory 220. In particular, the processor 250 may perform operations related to image analysis and acquisition of compensation values by the user device 200, which will be described below.

According to the configuration of the first image quality improvement processing app, the user device 200 may capture an image displayed on the display device 100 using the camera 230 and transmit, to the vehicle display controller 300, a compensation value obtained based on the captured image.

According to an embodiment, when capturing an image displayed on the display device 100, the user device 200 may capture the image by applying defocus. If the image is captured without applying defocus, moiré phenomenon occurs in the captured image due to interference between the display device screen and camera pixels, so that the image is not suitable for analysis.

Here, the image displayed on the display device 100 may be an image for quality analysis.

Figure 4A:
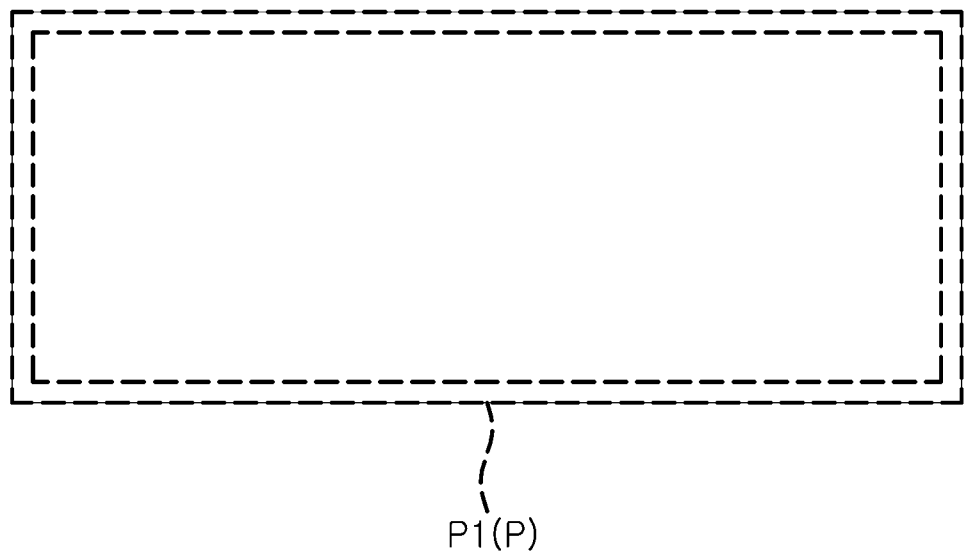
FIG. 4A and FIG. 4B are diagrams illustrating an example of an image for quality analysis according to an embodiment of the present disclosure.
Figure 4B:
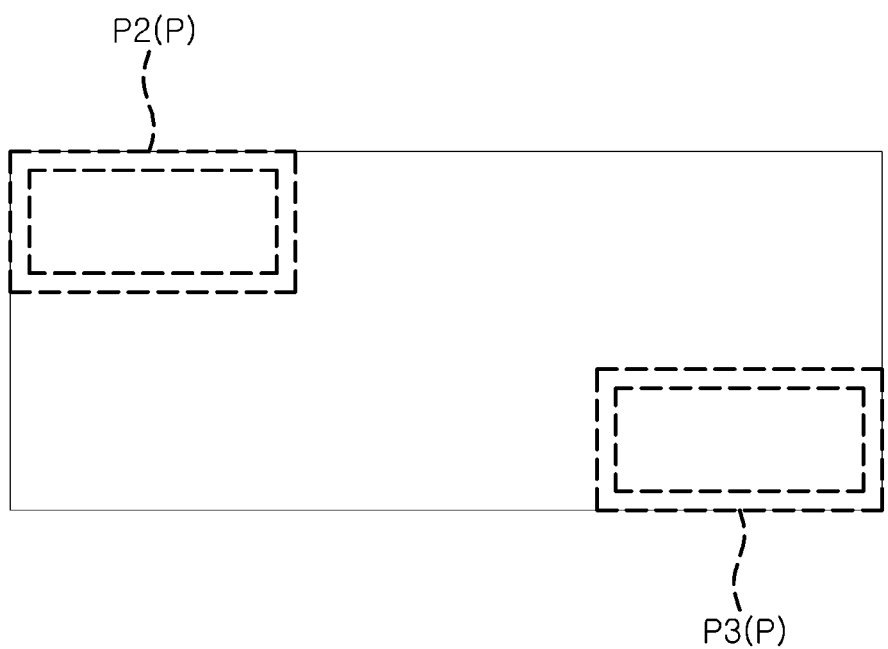

FIGS. 4A and 4B are diagrams illustrating an example of an image for quality analysis according to an embodiment of the present disclosure.

As shown in FIGS. 4A and 4B, an image for quality analysis according to an embodiment may include a marking pattern P for identifying the locations of stains and burn-ins. For example, the marking pattern P may be a rectangular marking pattern comprised of two lines at regular intervals. The lines may be solid lines or dotted lines, and the thicknesses and spacing of the two lines may be preferably configured in units of pixels and may be configured in various ways depending on system optimization.

The image for quality analysis may include one marking pattern P1 (see FIG. 4A) or include multiple marking patterns P2 and P3 (see FIG. 4B). For example, one marking pattern may be formed at a right angle along the edge of the image for quality analysis, and this marking pattern may be formed when analyzing the entire image for quality analysis (e.g., analysis of uniformity). For example, one marking pattern or multiple marking patterns may be formed locally in a predetermined area within the image for quality analysis, and such marking patterns may be formed during when analyzing the local area in detail.

The process for the user device 200 to capture an image for quality analysis may be performed through user manipulation or may be performed automatically as the first image quality improvement processing app is executed.

According to an embodiment, the user device 200 may analyze the captured image for quality analysis and determine whether or not the image is able to be used to obtain a compensation value. In other words, the user device 200 may determine whether or not the captured image for quality analysis is valid and, if it is determined to not be valid, the user device 200 may re-capture an image for quality analysis.

The user device 200 may determine the degree of defocus, based on the captured image for quality analysis, and determine whether or not defocus occurs and, if defocus occurs, whether or not the image for quality analysis is valid, based on the degree of defocus.

According to an embodiment, the user device 200 may determine whether or not defocus occurs and the degree of defocus, based on the degree to which the marking patterns included in the image for quality analysis overlap.

If defocus does not occur or if the degree of defocus exceeds a predetermined reference value, the user device 200 may determine that the corresponding image for quality analysis is not valid. In addition, if defocus occurs and if the degree of defocus is equal to or less than a reference value, the user device 200 may determine that the image for quality analysis is valid.

Here, the predetermined reference value may be defined as a threshold that enables accurate identification of stains or burn-in, and if the determined degree of defocus exceeds the reference value, it is impossible to accurately identify stains or burn-in.

Before re-capturing an image for quality analysis, the user device 200 may adjust the focus of the camera. For example, the user device 200 may adjust the focus of the camera 230, based on determining whether or not defocus occurs and the degree of defocus.

The user device 200 may analyze the captured image for quality analysis to determine the locations and shapes of stains and burn-ins. According to an embodiment, the user device 200 may determine the locations or shapes of stains and burn-ins, based on a line (outer line or inner line) configured as a reference line from among the two lines of the marking pattern.

Meanwhile, it is difficult to accurately identify stains or burn-in in an image for quality analysis captured in the state where the camera is not located at a correct position due to the difference in focus between the top and bottom.

Accordingly, the user device 200 according to an embodiment may determine whether or not the captured image for quality analysis was captured by a camera located at a correct position and, if it is determined that the captured image for quality analysis was captured by a camera that is not located at a correct position, re-capture an image for quality analysis.

According to an embodiment, the user device 200 may determine whether or not the captured image for quality analysis was captured by a camera located at a correct position, based on the marking pattern included in the image for quality analysis.

Here, the user device 200 may determine whether or not the image for quality analysis was captured by a camera located at a correct position, based on the marking pattern. Since the marking pattern included in the image for quality analysis is a rectangular marking pattern, the corner where the horizontal and vertical lines of the marking pattern included in the image for quality analysis captured by the camera located at a correct position intersect forms a right angle.

Based on the feature in which the corner where the horizontal and vertical lines of the marking pattern intersect forms a right angle, the user device 200 may determine whether or not the captured image for quality analysis was captured by a camera located at a correct position.

According to the embodiment, the user device 200 may determine, if the four corners of the marking pattern included in the image for quality analysis form right angles, that the image for quality analysis was captured by a camera located at a correct position and determine, if any of the four corners of the marking pattern included in the image for quality analysis does not form a right angle, that the image for quality analysis was captured by a camera that is not located at a correct position.

Before re-capturing an image for quality analysis, the user device 200 may adjust the camera so as to be located at a correct position. For example, the user device 200 may analyze how much the angle of each of the four corners of the marking pattern included in the image for quality analysis differs from the right angle and, based on the analysis results, adjust the camera position, but the analysis method is not limited thereto.

According to an embodiment, the user device 200 may perform analysis on the entire image for quality analysis and perform analysis on a local area within the image for quality analysis.

In the case of analyzing the entire image for quality analysis, the marking pattern may be formed along the edges of the image for quality analysis. The user device 200 may capture the entire image for quality analysis including the marking pattern and then determine the locations of stains or burn-ins, based on the outer line of the marking pattern included in the captured image for quality analysis.

In the case of analyzing a local area within image for quality analysis, one or more square marking patterns may be formed locally in the image for quality analysis. The user device 200 may capture one or more images for quality analysis respectively including one or more marking patterns formed locally and then perform analysis on the corresponding images.

For example, analysis on a local area within image for quality analysis may be conducted for detailed analysis of stains or burn-ins determined when analyzing the entire image for quality analysis, but is not limited thereto.

According to an embodiment, if a retry signal is received from the vehicle display controller 300, the user device 200 may perform the image quality improvement process again and transmit an obtained compensation value to the vehicle display controller 300.

According to an embodiment, if an end signal is received from the vehicle display controller 300, the user device 200 may end the image quality improvement process.

According to the configuration of the first image quality improvement processing app, the user device 200 may capture an image for quality analysis displayed on the display device 100 and transmit the captured image for quality analysis to the vehicle display controller 300.

If the user device 200 transmits the image for quality analysis to the vehicle display controller 300 as described above, acquisition of a compensation value for improving the image quality of the display device 100 may be performed by the vehicle display controller 300.

According to an embodiment, if a retry signal is received from the vehicle display controller 300, the user device 200 may re-capture an image for quality analysis displayed on the display device 100 and transmit the same to the vehicle display controller 300.

According to an embodiment, if an end signal is received from the vehicle display controller 300, the user device 200 may end the image quality improvement process.

The user device 200 may be a smartphone, tablet PC, etc. owned by the user, but is not limited thereto. For example, the user device 200 may be a PC mounted to a vehicle. However, the user device 200 is not limited to the examples mentioned above, and may be any electronic device implemented to perform the image quality improvement process according to an embodiment of the present disclosure.

Referring to FIGS. 1 and 3, the vehicle display controller 300 according to the embodiment may be linked with the user device 200. After being linked with the user device 200, the vehicle display controller 300 may perform an image quality improvement process.

For example, the vehicle display controller 300 may be a controller that constitutes an infotainment system and may be referred to as an "infotainment controller".

For example, the vehicle display controller 300 may be linked with the user device 200 as a second image quality improvement processing app is executed, and the linking process itself may be regarded as being included in the image quality improvement process.

The vehicle display controller 300 may include a communication module 310, a memory 320, an image output module 330, a user interface 340, and a processor 350, but the configurations of the vehicle display controller 300 are not limited thereto.

The communication module 310 is a component serving to communicate with the user device 200, and may be linked with the user device 200 through a network to transmit and receive a variety of data or signals.

The memory 320 may store configuration values or data necessary for the operation of at least one component (e.g., the processor 350) of the vehicle display controller 300, and may store one or more instructions executable by the processor 350.

According to an embodiment, the memory 320 may store images for quality analysis and a second image quality improvement processing app that analyzes the images for quality analysis to calculate compensation values, and may store compensation values obtained as the execution result.

The image output module 330 may be connected to the display device 100 and may output an image transmitted from the processor 350 to the display device 100.

The user interface 340 may receive instructions from the outside (e.g., a user).

For example, the user interface 340 may include an interface that receives an input for starting the image quality improvement process and, if the interface is manipulated by the user, output a signal to start the image quality improvement process to the processor 350.

As another example, the user interface 340 may include an interface that receives configuration of authority for the image quality improvement process. The interface is a component that receives configuration indicating whether the vehicle display controller 300 has master (or main) or slave (or sub) authority for the image quality improvement process, and may store a value corresponding to the input configuration in the memory 320 and output the same to the processor 350.

As another example, the user interface 340 may include an interface for receiving an input to retry or end the image quality improvement process. This interface may include a retry button and an end button and output signals corresponding to the retry button and the end button to the processor 350.

The processor 350 may perform the overall operation of the vehicle display controller 300 according to configuration, and may perform a predetermined operation by executing one or more instructions or programs stored in the memory 320.

According to an embodiment, the processor 350 may perform an image quality improvement process by executing the second image quality improvement processing app stored in the memory 320. In particular, the processor 350 may perform operations related to image analysis and acquisition of compensation values by the vehicle display controller 300, which will be described below.

According to an embodiment, the processor 350 may output an image for quality analysis input from the outside to the display device 100 such that the display device 100 may display the image for quality analysis.

For example, the processor 350 may be a controller constituting an infotainment system and may be referred to as an "infotainment controller".

According to the configuration of the second image quality improvement processing app, the vehicle display controller 300 may receive compensation values transmitted from the user device 200 and store the same in the memory 320. For example, the vehicle display controller 300 may store compensation values in a look-up table (LUT) for image correction.

The vehicle display controller 300 may output an image that was compensated by reflecting the compensation value to the display device 100 such that the display device 100 may display the compensated image. For example, the vehicle display controller 300 may compensate and output an image for quality analysis, and may compensate and output an infotainment image.

According to an embodiment, the compensated image for quality analysis may include a marking pattern. If the compensated image for quality analysis includes a marking pattern, the user has the advantage of being able to easily identify the compensated area.

After identifying the compensated image and determining the image quality of the image, the user may manipulate the vehicle display controller 300 to re-perform or end the image quality improvement process.

For example, the vehicle display controller 300 may be provided with a retry button or an end button, and the user may manipulate the retry button or the end button so as to re-perform or end the image quality improvement process.

In this embodiment, the vehicle display controller 300 may output a retry signal to the user device 200 when the retry button is manipulated and end the image quality improvement process after output an end signal to the user device 200 when the end button is manipulated.

The vehicle display controller 300 may release the linkage with the user device 200 in the process of ending the image quality improvement process.

After the image quality improvement process ends, the vehicle display controller 300 may output an infotainment image compensated by reflecting the compensation value stored in the memory 320, and the user may view the infotainment image with improved image quality.

According to the configuration of the second image quality improvement processing app, the vehicle display controller 300 may receive an image for quality analysis transmitted from the user device 200 and obtain a compensation value by analyzing the received image for quality analysis.

The process in which the vehicle display controller 300 obtains a compensation value by analyzing the image for quality analysis is the same as the process in which the user device 200 obtains a compensation value by analyzing the image for quality analysis, so a detailed description thereof will be omitted.

However, the vehicle display controller 300 may analyze the image for quality analysis to determine whether or not it is valid and, if it is determined not to be valid, output a re-capturing signal to the user device 200 to enable the user device 200 to perform re-capturing.

At this time, the vehicle display controller 300 may output the analysis results of the image for quality analysis together with the re-capturing signal in order for the user device 200 to adjust the camera.

In addition, the process after the vehicle display controller 300 obtains the compensation value is the same as the operation of the vehicle display controller 300 receiving the compensation value transmitted from the user device 200, so a detailed description thereof will be omitted.

Meanwhile, it has been described above by way of example that the compensation value is obtained by the user device 200 or the vehicle display controller 300. However, the compensation value may be obtained by both the user device 200 and the vehicle display controller 300.

As described above, in the case where the compensation value is obtained by both the user device 200 and the vehicle display controller 300, there is an advantage in which the compensation value may be stably obtained because duplication of the acquisition of the compensation value may be implemented.

For example, if the quality of the image compensated by reflecting the compensation value obtained by the user device 200 is continuously unsatisfactory, the user may enable the image to be is corrected by reflecting the compensation value obtained by the vehicle display controller 300.

If the compensation value is obtained by both the user device 200 and the vehicle display controller 300, one of the user device 200 and the vehicle display controller 300 may be configured as a master (or main device) and the other may be configured as a slave (or sub-device), and at the beginning of system operation, the device configured as the master may be operated to obtain the compensation value.

As another example, the vehicle display controller 300 may output a compensated image for quality analysis by reflecting the average of the compensation value obtained by the user device 200 and the compensation value obtained by itself.

Figure 5:
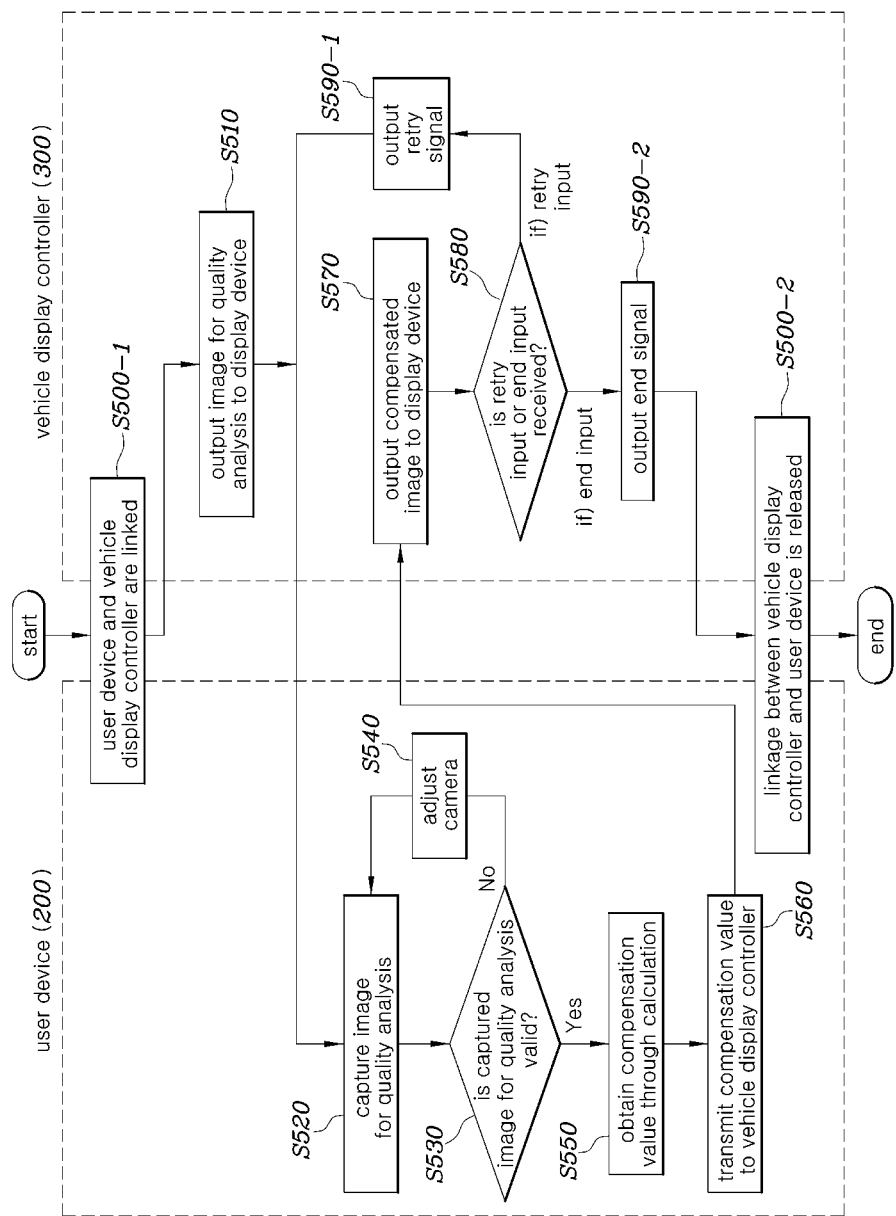
FIG. 5 is a flowchart illustrating an example of operation of a system for improving image quality of a vehicle display device according to an embodiment of the present disclosure.
Figure 6:
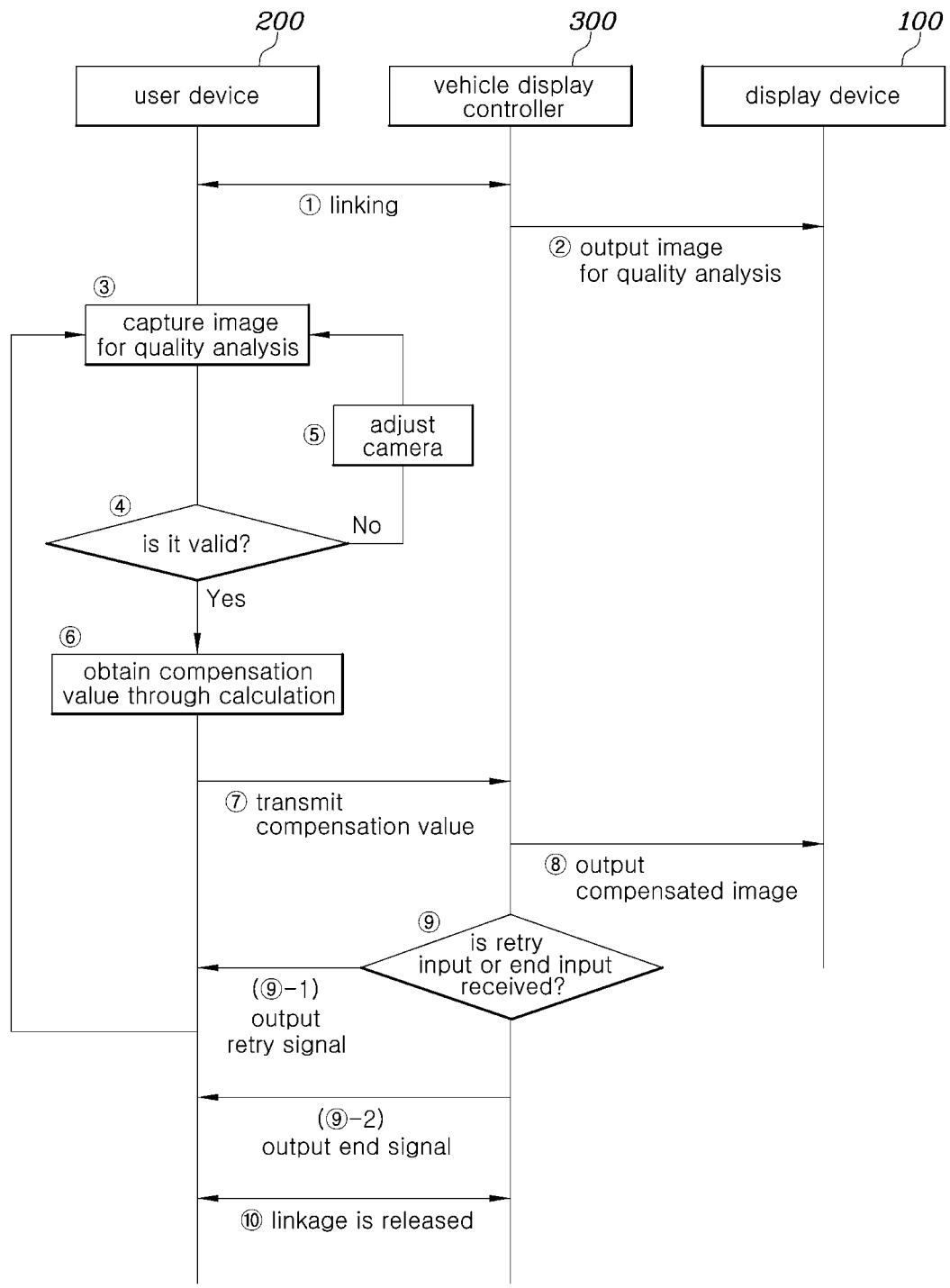
FIG. 6 is a diagram illustrating interaction between components according to the operation in FIG. 5.

FIG. 5 is a flowchart illustrating an example of operation of a system for improving image quality of a vehicle display device according to an embodiment of the present disclosure, and FIG. 6 is a diagram illustrating interaction between components according to the operation in FIG. 5.

The stepwise operations shown in FIG. 5 may be performed by the image quality improvement system described with reference to FIG. 1 to FIG. 3 and may be performed in the case where compensation values are obtained by the user device 200.

Referring to FIG. 1 to FIG. 3, FIG. 5, and FIG. 6, as an image quality improvement process begins, the user device 200 and the vehicle display controller 300 may be linked (S500-1, ①).

When the image quality improvement process begins, the user device 200 may execute a first image quality improvement processing app, and the vehicle display controller 300 may execute a second image quality improvement processing app.

When the image quality improvement process begins, the vehicle display controller 300 may output an image for quality analysis to the display device 100 (S510, ②) so that the display device 100 may display the image for quality analysis.

Afterwards, the user device 200 may capture the image for quality analysis displayed on the display device 100 using the camera 230 to obtain the image for quality analysis (S520, ③).

In step S520, the user device 200 may perform capturing according to the user's instructions input through the user interface 240 or according to the configuration of the first image quality improvement processing app.

Afterwards, the user device 200 may analyze the image for quality analysis and determine whether or not the image for quality analysis is valid (S530, ④).

In step S530, the user device 200 may determine the degree of defocus, based on the captured image for quality analysis, and may determine whether or not the image for quality analysis is valid, based on whether or not defocus occurs and the degree of defocus if defocus occurs.

Here, the user device 200 may determine whether or not defocus occurs and the degree of defocus, based on the degree to which marking patterns included in the image for quality analysis overlap.

If defocus does not occur or if the degree of defocus exceeds a predetermined reference value, the user device 200 may determine that the corresponding image for quality analysis is not valid. In addition, if defocus occurs and if the degree of defocus is equal to or less than a reference value, the user device 200 may determine that the image for quality analysis is valid.

In step S530, the user device 200 may determine whether or not the image for quality analysis was captured by a camera (correct-position camera) located at a correct position and, if it is determined that the image for quality analysis was captured by the correct-position, determine that the image for quality analysis is valid, and, if it is determined that the image for quality analysis was captured by a camera that is not located at a correct position, determine that the image for quality analysis is not valid.

For example, the user device 200 may determine, if the four corners of a marking pattern included in the image for quality analysis form right angles, that the image for quality analysis was captured by a camera located at a correct position and determine, if any of the four corners of the marking pattern included in the image for quality analysis does not form a right angle, that the image for quality analysis was captured by a camera that is not located at a correct position.

As a result of the determination in step S530, if it is determined that the image for quality analysis is not valid ("No" in S530), the user device 200 may adjust the camera (S540, ⑤) and perform step S520 for re-capturing.

In step S540, the user device 200 may adjust the position of the camera if the image for quality analysis is captured by a camera that is not located at the correct position, and adjust the camera focus if defocus has not occurred or if the degree of defocus exceeds a reference value.

As a result of the determination in step S530, if the image for quality analysis is determined to be valid ("Yes" in S530), the user device 200 may obtain a compensation value through a predetermined calculation process (S550, ⑥), and transmit the obtained compensation value to the vehicle display controller 300 (S560, ⑦).

Afterwards, the vehicle display controller 300 may output, to the display device 100, an image compensated by reflecting the compensation value transmitted from the user device 200 (S570, ⑧), so that the display device 100 may display the compensated image.

The user may identify the compensated image and determine the image quality of the image, and then may manipulate the user interface 340 of the vehicle display controller 300 so as to re-perform or end the image quality improvement process.

Accordingly, the vehicle display controller 300 may determine whether a retry input or an end input is received through the user interface 340 (S580, ⑨).

If a retry input is received, the vehicle display controller 300 may output a retry signal to the user device 200 (S590-1, ⑨-1), so that the user device 200 may perform step S520 (③).

In addition, if an end input is received, the vehicle display controller 300 may output an end signal to the user device 200 (S590-2, ⑨-2) such that the user device 200 ends the image quality improvement process and, may end its own image quality improvement process.

When the image quality improvement process ends as described above, the vehicle display controller 300 may store the compensation value in the memory 320, and the linkage between the vehicle display controller 300 and the user device 200 may be released (S500-2, ⑩).

Figure 7:
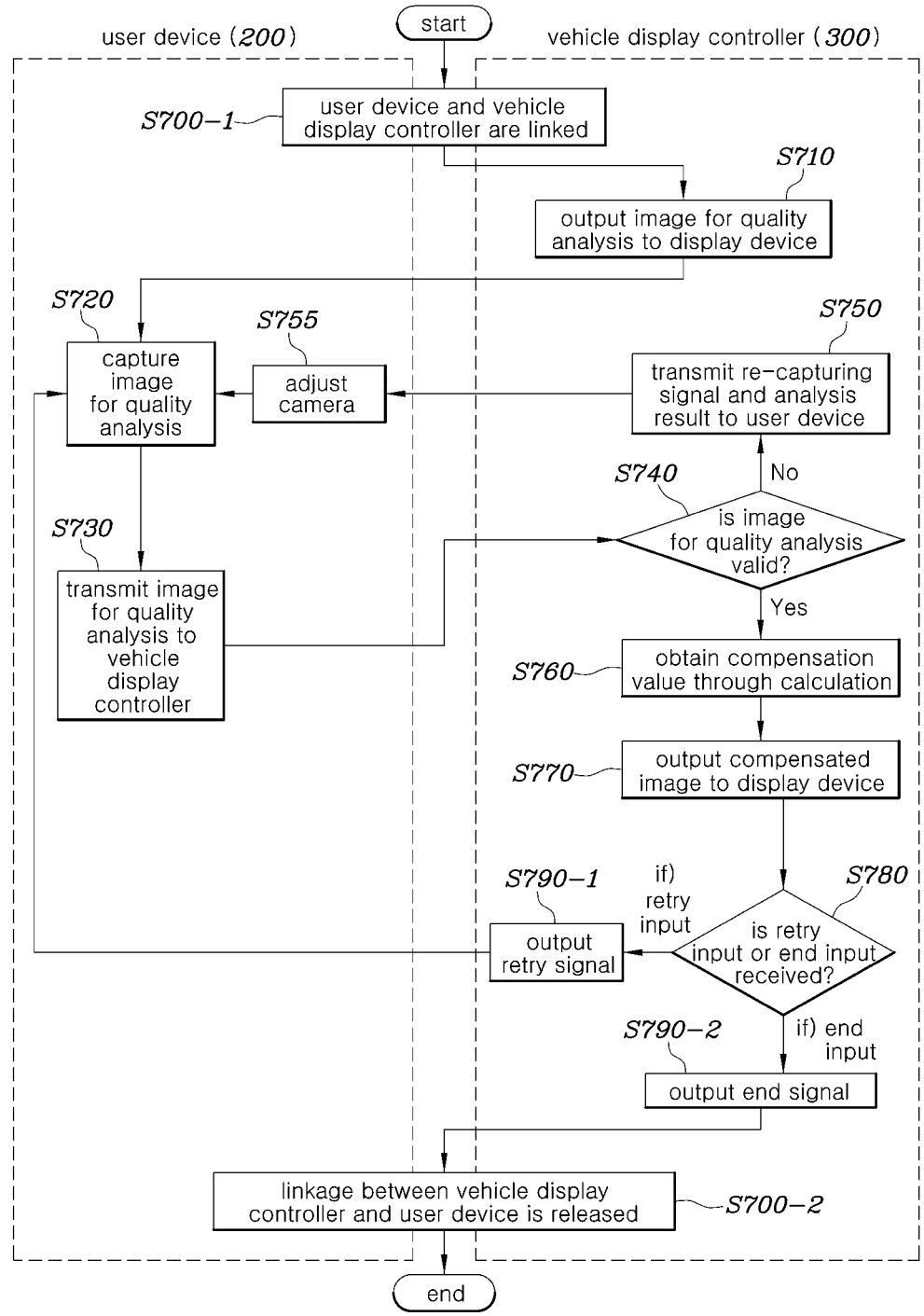
FIG. 7 is a flowchart illustrating another example of operation of a system for improving image quality of a vehicle display device according to an embodiment of the present disclosure.
Figure 8:
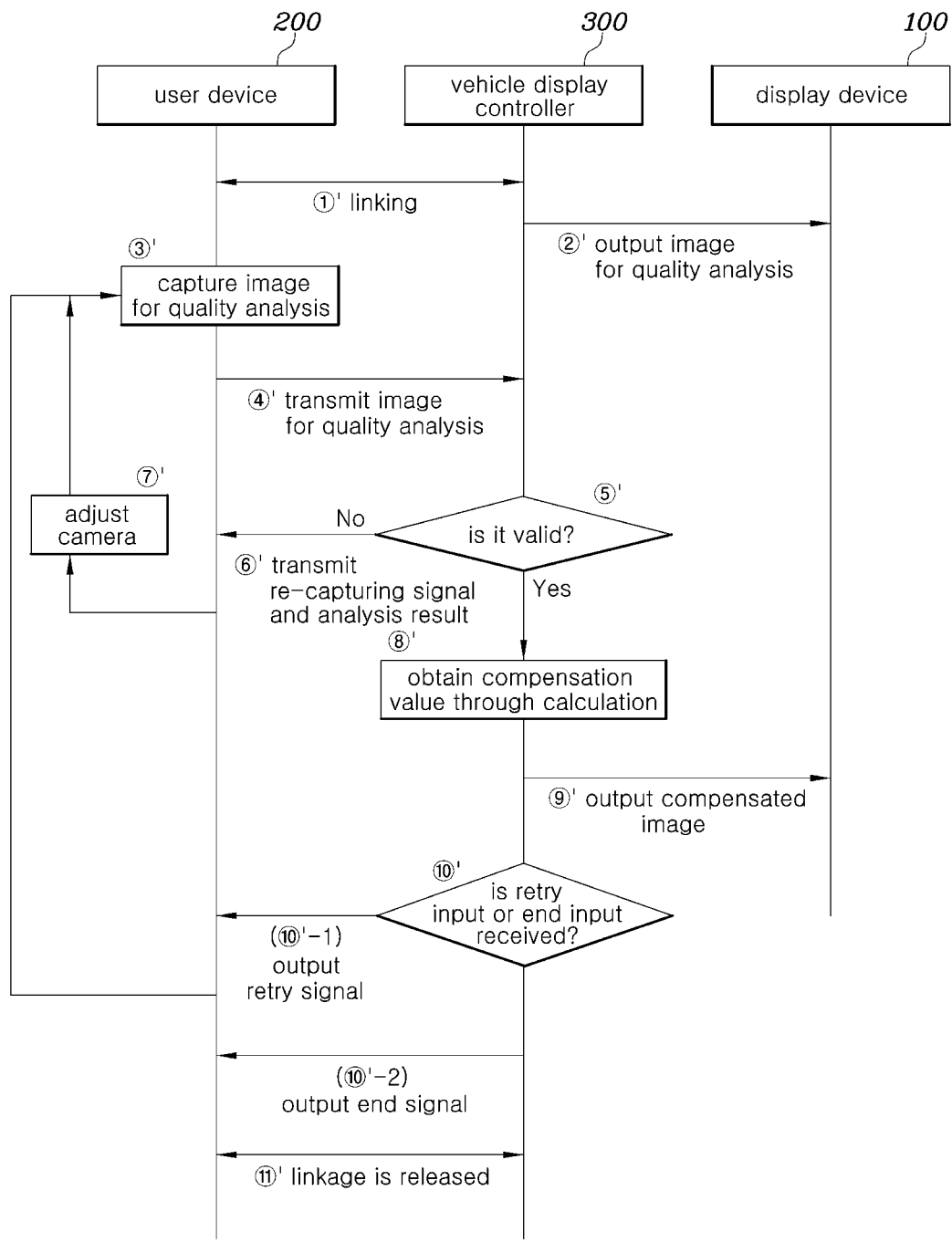
FIG. 8 is a diagram illustrating interaction between components according to the operation in FIG. 7.

FIG. 7 is a flowchart illustrating another example of operation of a system for improving image quality of a vehicle display device according to an embodiment of the present disclosure, and FIG. 8 is a diagram illustrating interaction between components according to the operation in FIG. 7.

The stepwise operations shown in FIG. 7 may be performed by the image quality improvement system described with reference to FIGS. 1 to 3 and may be performed in the case where compensation values are obtained by the vehicle display controller 300.

Referring to FIG. 1 to FIG. 3, FIG. 7, and FIG. 8, as an image quality improvement process begins, the user device 200 and the vehicle display controller 300 may be linked (S700-1, ①').

When the image quality improvement process begins, the user device 200 may execute a first image quality improvement processing app, and the vehicle display controller 300 may execute a second image quality improvement processing app.

When the image quality improvement process begins, the vehicle display controller 300 may output an image for quality analysis to the display device 100 (S710, ②') so that the display device 100 may display the image for quality analysis.

Afterwards, the user device 200 may capture the image for quality analysis displayed on the display device 100 using the camera 230 (S720, ③') and transmit the captured image for quality analysis to the vehicle display controller 300 (S730, ④').

In step S720, the user device 200 may perform capturing according to the user's instructions input through the user interface 240 or according to the configuration of the first image quality improvement processing app.

Afterwards, the vehicle display controller 300 may analyze the image for quality analysis and determine whether or not the image for quality analysis is valid (S740, ⑤').

The analysis and determination process in step S740 may be performed in the same manner as the analysis and determination process in step S530 shown in FIG. 5, and a detailed description thereof will be omitted.

As a result of the determination in step S740, if it is determined that the image for quality analysis is not valid ("No" in S740), the vehicle display controller 300 may transmit the analysis result along with a re-capturing signal to the user device 200 (S750, ⑥'), so that the user device 200 may adjust the camera (S755, ⑦') and then perform step S720.

The camera adjustment in step S755 may be performed in the same manner as the camera adjustment in step S540 in FIG. 5, so a detailed description thereof will be omitted.

As a result of the determination in step S740, if it is determined that the image for quality analysis is valid ("Yes" in S740), the vehicle display controller 300 may obtain a compensation value through a predetermined calculation process (S760, ⑧').

Afterwards, the vehicle display controller 300 may output, to the display device 100, an image compensated by reflecting the compensation value (S770, ⑨'), so that the display device 100 may display the compensated image.

The user may identify the compensated image and determine the image quality of the image, and then may manipulate the user interface 340 of the vehicle display controller 300 so as to re-perform or end the image quality improvement process.

Accordingly, the vehicle display controller 300 may determine whether a retry input or an end input is received through the user interface 340 (S780, ⑩').

If a retry input is received, the vehicle display controller 300 may output a retry signal to the user device 200 (S790-1, ⑩'-1), so that the user device 200 may perform step S720.

In addition, if an end input is received, the vehicle display controller 300 may output an end signal to the user device 200 (S790-2, ⑩'-2) such that the user device 200 ends the image quality improvement process, and may end its own image quality improvement process.

When the image quality improvement process ends as described above, the vehicle display controller 300 may store the compensation value in the memory 320, and the linkage between the vehicle display controller 300 and the user device 200 may be released (S700-2, ⑪').

As described above, the compensation value may be obtained by the user device 200 or the vehicle display controller 300.

For the convenience of explanation, the user device 200 and vehicle display controller 300 that obtain the compensation value will be referred to as "compensation value obtaining devices".

According to an embodiment, the compensation value obtaining devices 200 and 300 may obtain compensation values using average values and errors.

The compensation value obtaining devices 200 and 300 may divide the area within the marking pattern of the image for quality analysis by pixels depending on the screen resolution, thereby obtain data on color and brightness.

For example, in the case where the screen resolution is FHD (1920*1080), the compensation value obtaining devices 200 and 300 may obtain color and brightness data about 1920*1080 pixels.

In addition, the compensation value obtaining devices 200 and 300 may calculate a brightness average of all pixels, determine a (+) or (−) brightness value for each pixel as the compensation value, based on the average, and configure a look-up table (LUT).

As the look-up table is subdivided by gray levels to store more data, the image quality may be further improved, and it may be configured in consideration of cost and system efficiency.

For example, the compensation value obtaining devices 200 and 300 may configure a look-up table of 127 gray levels, and may also configure a look-up table of 64/128/192 gray levels.

Figure 9:
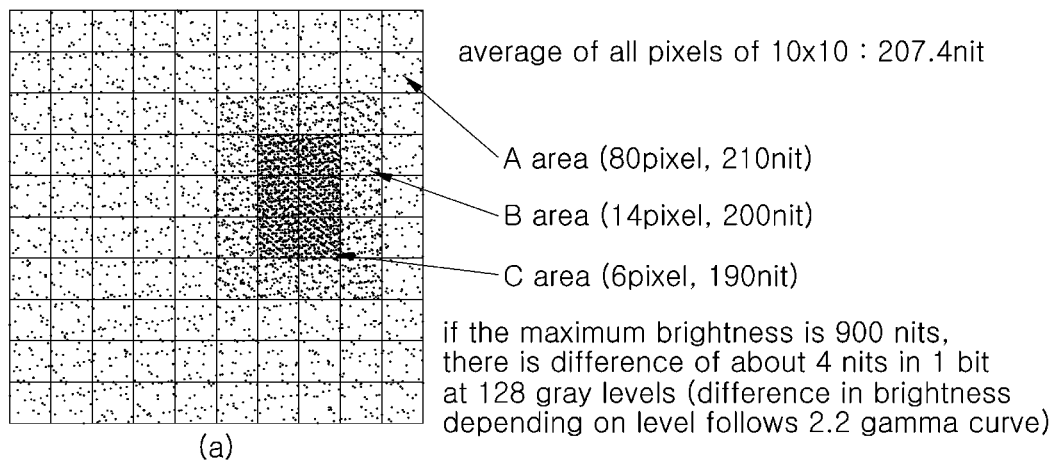
FIG. 9 is a diagram illustrating an example of configuring a compensation value look-up table for improving image quality of a vehicle display device according to an embodiment of the present disclosure.
Figure 9:
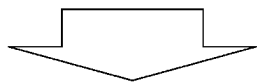

FIG. 9 is a diagram illustrating an example of configuring a compensation value look-up table for improving image quality of a vehicle display device according to an embodiment of the present disclosure, which illustrates an example of configuring a compensation value look-up table from the image for quality analysis displayed on the screen having a resolution of 10*10pixels.

As shown in (a) of FIG. 9, it is assumed that the average brightness of all pixels is 207.4nits and that the brightness of area A (80 pixels), area B (14 pixels), and area C (6 pixels) of the image for quality analysis is 210 nits, 200 nits, and 190 nits.

In addition, if the maximum brightness is 900 nits, there is a difference of about 4 nits in 1 bit at 128 gray levels, and the difference in brightness depending on the gray level follows a 2.2 gamma curve.

The compensation value obtaining devices 200 and 300 may configure a compensation value look-up table shown in (b) of FIG. 9 from the image for quality analysis in (a) of FIG. 9.

Although embodiments of the present disclosure have been described above with reference to the accompanying drawings, the present disclosure is not necessarily limited to these embodiments and various modifications and changes may be made thereto without departing from the technical idea of the present disclosure. Therefore, the embodiments disclosed herein are not intended to limit the technical idea of the present disclosure but intended to explain the technical idea of the present disclosure, and the scope of the technical idea of the present disclosure is not limited by these embodiments. Accordingly, the embodiments as described above should be construed as be illustrative and non-limitative in all aspects. The scope of protection of the present disclosure should be defined by the appended claims, and all technical ideas equivalent to the claims shall be construed as falling within the scope of protection of the present disclosure.

What is claimed is:

1. A method for improving image quality of a vehicle display device through linking a vehicle display controller and a user device, the method comprising:
    capturing, using the user device, an image for quality analysis displayed on the display device, wherein capturing the image for quality analysis includes defocusing the image on the display device when capturing the image for quality analysis;
    determining, by the user device, whether or not the captured image for quality analysis is valid;
    in response to the captured image for quality analysis being valid, obtaining, using the user device, a compensation value based on the captured image for quality analysis; and
    transmitting, using the user device, the compensation value to the vehicle display controller such that the vehicle display controller outputs an image based at least in part on the compensation value,
    wherein the step of determining further comprises determining a degree of defocus based on a marking pattern included in the captured image for quality analysis.

2. The method for improving image quality of a vehicle display device of claim 1, wherein the step of determining comprises determining whether or not the captured image for quality analysis is an image captured by a camera located at a correct position based on a direction of a marking pattern included in the captured image for quality analysis.

3. The method for improving image quality of a vehicle display device of claim 1, wherein the determining the degree of defocus further comprises:
    determining whether or not defocus occurs and a degree of defocus when defocus occurs, the degree of defocus being determined based on a degree to which the marking pattern overlaps; and
    determining that the captured image for quality analysis is not valid when defocus does not occur or the degree of defocus exceeds a predetermined reference value.

4. The method for improving image quality of a vehicle display device of claim 2, wherein determining whether or not the captured image for quality analysis is an image captured by a camera located at a correct position further comprises:
    determining that the image for quality analysis was captured by the camera located at the correct position when four corners of the marking pattern each form right angles.

5. The method for improving image quality of a vehicle display device of claim 1, comprising:
    re-performing the capturing of the image for quality analysis in response to receiving a retry signal from the vehicle display controller after transmitting the compensation value to the vehicle display controller; and
    ending image quality analysis in response to receiving an end signal from the vehicle display controller.

6. The method for improving image quality of a vehicle display device of claim 1, further comprising:
    in response to the captured image for quality analysis not being valid, adjusting the camera and then re-performing the capturing of the image for quality analysis.

7. A method for improving image quality of a vehicle display device through linking a vehicle display controller and a user device, the method comprising:
    outputting, using the vehicle display controller, an image for quality analysis to the display device, the image being defocused and including a marking pattern;
    receiving, by the vehicle display controller, a compensation value from the user device, the compensation value that is dependent upon a degree of defocus of the captured image determined at the user device, the degree of defocus being based at least in part on analysis of the marking pattern in the captured image; and
    outputting, to the vehicle display device, an image utilizing the compensation value.

8. The method for improving image quality of a vehicle display device of claim 7, comprising:
    receiving, by the vehicle display device, a retry or end input signal via a user interface after outputting the image utilizing the compensation value; and
    outputting, by the vehicle display device, a retry signal or an end signal to the user device according to the retry or end input.

9. A system for improving image quality of a vehicle display device, comprising:
    a user device configured to capture an image for quality analysis displayed on the vehicle display device to determine whether or not the captured image for quality analysis is valid, and if so, obtain a compensation value based on the captured image for quality analysis, and to transmit the compensation value to the vehicle display controller, and
    a vehicle display controller configured to output the image for quality analysis to the display device and to output an image utilizing the compensation value transmitted from the user device to the display device,
    wherein:
        the image for quality analysis is output to the display screen is defocused and includes a marking pattern,
        the user device is configured to determine whether the captured image is valid by analyzing the marking pattern to determine a degree of defocus of the captured image.

* * * * *